June 4, 1935.  J. R. MAHAN ET AL  2,003,601
GEARED PUMPING POWER
Filed Dec. 14, 1932
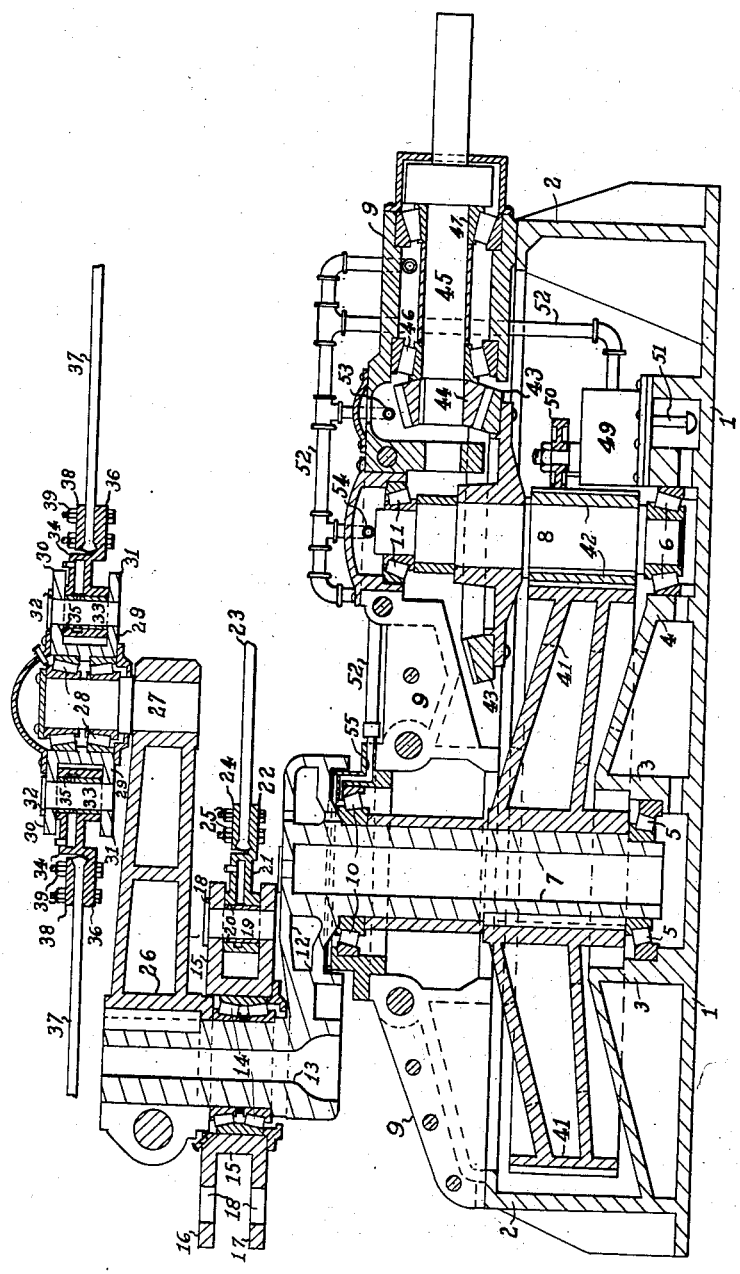
INVENTOR
J. R. Mahan
J. B. Picard
by F. N. Barber
Attorney Patented June 4, 1935

2,003,601

UNITED STATES PATENT OFFICE 2,003,601

GEARED PUMPING POWER

Joseph R. Mahan and John B. Picard, Toledo, Ohio, assignors to The National-Superior Company, Toledo, Ohio, a corporation of Delaware Application December 14, 1932, Serial No. 647,104

7 Claims. (Cl. 74—51)

Our invention relates generally to improvements in central pumping power machines for operating oil well pumping jacks, and more particularly to geared pumping power machines.

The object of our invention generally stated, is the provision of a geared pumping power that shall be simple and efficient in operation and readily and economically manufactured.

A more specific object of our invention is to provide for a geared pumping power an improved means for lubricating the bearings at the lower ends of the shafts which actuate certain members of the gearing.

The accompanying drawing, wherein we have illustrated a practical embodiment of the principles of our invention, is a vertical section taken through the geared pumping power showing the operating parts in operative assembly.

Referring to the drawing, 1 designates a base having integral sides 2 forming a lubricant reservoir or chamber. Projecting from the base 1 are the pockets or bearing supports 3 and 4 which support the roller bearings 5 and 6. The lower ends of the vertical shafts 7 and 8 are held rotatably in the said bearings respectively. The partable cover 0, only one lateral half being shown, is supported by the sides 2 of the base and contains the upper bearings 10 and 11 of the vertical shafts 7 and 8 respectively.

The vertical shaft 7 extending upwardly from the base terminates in a crank arm 12 integral therewith above the cover. The lower face of the crank arm 12 is provided with a recess which extends down over and covers the bearing 10. The crank pin 13 supported on the outer end of the crank arm 12, and integral therewith, extends upwardly and is arranged to support on its lower portion the bearings 14. Rotatably mounted upon the bearings 14 is the power transmission wheel 15 having upper and lower horizontal flanges 16 and 17. The holes 18 are positioned intermediate of the hub and the periphery of these flanges so as to receive a plurality of pins 19, only one shown. The pins 19 are provided to secure the bearings 20 of the clamp member 21 to the wheel. The outer portion of the clamp member is offset, forming the tongue 22. The pull rod 23 is clamped to the tongue by means of a suitable clamp plate 24 and bolts 25.

One end of the crank arm 26 is keyed and clamped to the upper end of the crank pin 13 while the other end supports a second crank pin 27. The crank pin 27 supports the bearings 28 on which the power transmission wheel 29 is rotatably mounted. The wheel 29 is similar to the wheel 15, having the upper and lower flanges 30 and 31 and the holes 32 placed therein to receive the pins 33. One end of the clamp members 34 have their bearings 35 surrounding the pins, and on the other end the tongues 36 for clamping the pull rods 37 by means of suitable clamp plates 38 and the bolts 39. The stroke of the pull rods connected to the upper wheel may be longer or shorter than those connected to the lower wheel due to the length of the upper crank arm being greater or less than the lower crank arm.

The lower portion of the vertical crank shaft 7 has keyed thereto the gear 41 which meshes with the pinion 42 on the lower portion of the vertical shaft 8 and is keyed thereto. A beveled ring gear 43 positioned above the pinion 42 on the shaft 8 and secured thereto meshes with the pinion 44 which is secured on the inner end of the horizontal shaft 45 which is supported by the bearings 46 and 47 held by the cover 9. The outer portion of the horizontal shaft projects beyond the base 1 and may be coupled with any ordinary source of power, such as a flexible coupling for a direct motor drive or a pulley for a belt drive.

It will be understood that the pull rods 23 and 37 are connected to pumping jacks or the like for pumping oil from oil wells, the power transmission wheels will gyrate in a horizontal plane about the axis of the vertical shaft 7, and the crank pins rotate in the bearings of the wheels which are held in the same relative position by the pull rods.

The oil pump 49, which is operated by the gear 50 in mesh with the pinion 42, is arranged to draw oil from the reservoir or chamber through the pipe 51 and force it through the oil line 52 to the positions 53, 54, and 55 in the cover 9 for lubricating the beveled pinion 44, the bearings of the vertical shaft 8, and the bearings of the vertical shaft 7, respectively. The oil may be transmitted to these places for lubrication by separate oil lines, but I have shown only one for simplicity. Oil is conveyed also to the right by the line 52 to the bearings 46 and 47.

We claim:—

1. In a pumping power of the character described, the combination of a base having a floor and side walls and forming a lubricant chamber, a pair of bearings mounted on the floor of the base, a pair of parallel vertical shafts having their lower ends journaled in said bearings, a partible cover detachably secured to said base, antifriction bearings held between the parts of said cover and in which said shafts are journaled, a crank on the upper end of one of said shafts above the base, a gear mounted on said shaft within the base, a pinion mounted on the second vertical shaft within the base and meshing with said gear, a beveled gear mounted on said second shaft within the base, a horizontal driving shaft extending into the base, and a beveled pinion mounted on said driving shaft and meshing with said beveled gear.

2. In a pumping power of the character described, the combination of a base having a floor and side walls and forming a lubricant chamber, a pair of bearings mounted on the floor of the base, a pair of parallel vertical shafts having their lower ends journaled in said bearings, a partible cover detachably secured to said base, antifriction bearings held between the parts of said cover and in which said shafts are journaled, a crank on the upper end of one of said shafts above the base, a gear mounted on said shaft within the base, a pinion mounted on the second vertical shaft within the base and meshing with said gear, a beveled gear mounted on said second shaft within the base, a horizontal driving shaft extending into the base, bearings for said horizontal shaft carried on the under side of said cover, and a beveled pinion mounted on said driving shaft and meshing with said beveled gear.

3. In a pumping power of the character described, the combination of a base having a floor and side walls and forming a lubricant chamber, a pair of bearings mounted on the floor of the base, a pair of parallel vertical shafts having their lower ends journaled in said bearings, a partible cover detachably secured to said base, antifriction bearings held between the parts of said cover and in which said shafts are journaled, a crank on the upper end of one of said shafts above the base, a gear mounted on said shaft within the base, a pinion mounted on the second vertical shaft within the base and meshing with said gear, an oil pump within the base driven from said pinion, a branched oil-delivery pipe connected to the pump and having nozzles to deliver oil to the bearing, and means for applying rotative power to the second vertical shaft.

4. In a pumping power of the character described, the combination of a base having a floor and side walls and forming a lubricant reservoir, a bearing in the floor of the base, a vertical shaft journaled in the bearing, a partible cover for said base, a second bearing supported between the parts of the cover and in which said shaft is journaled, said shaft protruding above said cover, a crank integral with the upper end of the shaft and extending radially thereof, a vertical crank pin fixed on the outer end of the shaft, a power transmission wheel rotatably mounted on said pin, a second crank having a hub which is fixed on the pin above the power wheel, a pin on the free end of the second crank, and a second power wheel rotatably mounted on the second pin.

5. In a pumping power of the character described, the combination of a base having a floor and side walls and forming a lubricant reservoir, a bearing in the floor of the base, a vertical shaft journaled in the bearing, a partible cover for said base, a second bearing supported between the parts of the cover and in which said shaft is journaled, said shaft protruding above said cover, a crank integral with the upper end of the shaft and extending radially thereof, a vertical crank pin fixed on the outer end of the shaft, a power transmission wheel rotatably mounted on said pin, a second crank having a split hub which is clamped on the pin above the power wheel, a pin on the free end of the second crank, and a second power wheel rotatably mounted on the second pin.

6. In a pumping power of the character described, the combination of a base having a floor and side walls and forming a lubricant chamber, a pair of bearings on the floor of the base, vertical shafts having their lower ends journaled in the bearings, a cover for said base, bearings in said cover in which said shafts are journaled, a crank on the upper end of one of said shafts above the base, a gear mounted on said shaft within the base, a pinion on the other shaft within the base and meshing with said gear, a beveled gear mounted on the second shaft within the base, a driving shaft extending within the base, and a beveled pinion mounted on said driving shaft and meshing with the beveled gear.

7. In a pumping power for reciprocating pull rods and the like, the combination of a substantially circular base member broadly extended in a substantially continuous horizontal plane, a rotary vertical crank shaft journaled at its lower end in the center of the base member, a conical cover structure supported by the base member adjacent the lower periphery of the cover, and a bearing mounted in an aperture in said cover and in which the upper portion of the rotary crank shaft is journaled, and crank means on the shaft above said cover arranged for pull rod connection.

JOSEPH R. MAHAN.
JOHN B. PICARD.